US012434600B2

(12) United States Patent
Muramatsu (10) Patent No.: US 12,434,600 B2
(45) Date of Patent: Oct. 7, 2025

(54) METHOD OF CONTROLLING FLYING OBJECT, FLYING OBJECT, AND COMPUTER PROGRAM (71) Applicant: GS Yuasa International Ltd., Kyoto (JP)

(72) Inventor: Hiromasa Muramatsu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 341 days.

(21) Appl. No.: 17/801,701

(22) PCT Filed: Feb. 24, 2021

(86) PCT No.: PCT/JP2021/006815
§ 371 (c)(1),
(2) Date: Jan. 20, 2023

(87) PCT Pub. No.: WO2021/177097
PCT Pub. Date: Sep. 10, 2021

(65) Prior Publication Data
US 2023/0242284 A1 Aug. 3, 2023

(30) Foreign Application Priority Data
Mar. 2, 2020 (JP) ................... 2020-035226

(51) Int. Cl.
*B60L 58/27* (2019.01)
*B60L 3/00* (2019.01)
(Continued)

(52) U.S. Cl.
CPC ............ *B60L 58/27* (2019.02); *B60L 3/0046* (2013.01); *B60L 58/13* (2019.02); *B64U 50/19* (2023.01);
(Continued)

(58) Field of Classification Search
CPC ........ B60L 3/0046; B60L 58/13; B60L 58/27; B60L 2200/10; B64C 39/024;
(Continued)

(56) References Cited

U.S. PATENT DOCUMENTS

2020/0153066 A1* 5/2020 Tajika ............... H01M 10/6571
2021/0253243 A1 8/2021 Tsutsui et al.
2021/0309122 A1 10/2021 Wake et al.

FOREIGN PATENT DOCUMENTS

JP 5887641 B1 * 3/2016
JP 2018-157524 A 10/2018
(Continued)

OTHER PUBLICATIONS

International Search Report and Written Opinion for International Application No. PCT/JP2021/006815, dated May 11, 2021, (8 pages), Japan Patent Office, Tokyo, Japan.

*Primary Examiner* — Charles J Han
(74) *Attorney, Agent, or Firm* — ALSTON & BIRD LLP (57) ABSTRACT

A method of controlling a flying object 1 including a generator 5, which includes solar cells, and an energy storage apparatus 7 is configured such in a case where, during flying of the flying object 1, a voltage of an energy storage device 6 in the energy storage apparatus 7 reaches a lower limit voltage of a voltage range in which charge and discharge of electricity can be reversibly repeated, the flying object 1 is made to keep flying and/or descend while making the energy storage device 6 discharge electricity within a voltage range lower than the lower limit voltage.

9 Claims, 6 Drawing Sheets (51) Int. Cl.
  *B60L 58/13* (2019.01)
  *B64U 10/13* (2023.01)
  *B64U 50/19* (2023.01)
  *B64U 50/31* (2023.01)
  *H02J 7/35* (2006.01)
(52) U.S. Cl.
  CPC ............... *B64U 50/31* (2023.01); *H02J 7/35* (2013.01); *B60L 2200/10* (2013.01); *B64U 10/13* (2023.01)
(58) Field of Classification Search
  CPC .... B64U 10/13; B64U 10/25; B64U 2101/20; B64U 50/19; B64U 50/31; H01M 10/0525; H01M 10/425; H01M 10/44; H01M 10/465; H01M 10/48; H01M 2220/20; H02J 7/00306; H02J 7/35; Y02E 60/10; Y02T 50/50; Y02T 50/60; Y02T 90/167
  See application file for complete search history.

(56) References Cited

FOREIGN PATENT DOCUMENTS

| | | | |
|---|---|---|---|
| JP | 2018186346 A | * 11/2018 | ............... B64B 1/14 |
| JP | 2019-021444 A | 2/2019 | |
| JP | 2019-054490 A | 4/2019 | |
| JP | 2020-048169 A | 3/2020 | |
| WO | WO-2019/189075 A1 | 10/2019 | |

* cited by examiner

METHOD OF CONTROLLING FLYING OBJECT, FLYING OBJECT, AND COMPUTER PROGRAM

CROSS REFERENCE TO RELATED APPLICATIONS

This application is a national stage application, filed under 35 U.S.C. § 371, of International Application No. PCT/JP2021/006815, filed Feb. 24, 2021, which claims priority to Japanese Application No. 2020-035226, filed Mar. 2, 2020, the contents of both of which as are hereby incorporated by reference in their entirety.

BACKGROUND

Technical Field

The present invention relates to a method of controlling a flying object, a flying object, and a computer program.

Description of Related Art

In recent years, various electric flying objects have been developed. An unmanned flying object such as a drone includes a secondary battery and a battery control circuit. A motor is rotated by discharge of a secondary battery, and a rotary blade is rotated by the rotation of the motor. To ensure a mileage while suppressing the increase of a weight of the flying object, a secondary battery is required to have higher energy density more than ever.

There has been also developed a high-altitude platform station (HAPS), stratosphere platform station, that mounts a wireless station and flies or slides in an air zone in a stratosphere having an altitude of 11 km to 50 km (see Patent Document JP-A-2019-54490, for example). Various types of HAPS such as solar planes, airships, stratosphere jet planes have been developed. HAPS stays in the stratosphere at the position of an altitude of 20 km, for example, during its operation. HAPS can be simultaneously connected with a large number of terminal devices in a wide range. Accordingly, by realizing the communication between HAPS and artificial satellites and ground stations, a high-speed communication infrastructure can be constructed. A stable communication environment can be maintained also when a disaster occurs.

The HAPS may include: a solar panel having solar cells and an energy storage apparatus having energy storage devices such as lithium ion secondary batteries. The HAPS may fly in the stratosphere using electricity generated by a solar panel at daytime, and may fly in the stratosphere using electricity discharged from an energy storage apparatus at night. The energy storage device that the HAPS includes is required to have a high discharge capacity (full charge capacity) in order to make a large-sized flying object keep flying at night.

BRIEF SUMMARY

There is a case where, due to some unforeseeable circumstances, a voltage of an energy storage device in an energy storage apparatus reaches a lower limit voltage of a voltage range in which charge and discharge of electricity can be reversibly repeated at night. The inventors of the present invention have studied a safety measure for continuing the flight of a HAPS in such a case. Also with respect to flying objects other than the HAPS, it is expected that the need for safety measures in a case where discharge energy of secondary batteries is lost will increase in the future.

Accordingly, it is an object of the present invention is to provide a method for controlling a flying object, a flying object, and a computer program that contribute to the improvement of the safety of a flight operation.

According to an aspect of the present invention, there is provided a method of controlling a flying object including a generator, which includes a solar cell, and an energy storage apparatus, wherein in a case where, during flying of the flying object, a voltage of an energy storage device in the energy storage apparatus reaches a lower limit voltage of a voltage range in which charge and discharge of electricity can be reversibly repeated, the flying object is made to keep flying and/or descend while making the energy storage device discharge electricity within a voltage range lower than the lower limit voltage.

According to another aspect of the present invention, there is provided a flying object including a generator, which includes a solar cell, and an energy storage apparatus, wherein in a case where, during flying of the flying object, a voltage of an energy storage device in the energy storage apparatus reaches a lower limit voltage of a voltage range in which charge and discharge of electricity can be reversibly repeated reaches a lower limit voltage of the voltage range, the flying object is made to keep flying and/or descend while making the energy storage device discharge electricity within a voltage range lower than the lower limit voltage.

According to another aspect of the present invention, there is provided a computer program that causes a computer to execute processing for: determining, during flying of a flying object that includes a generator, which includes a solar cell, and an energy storage apparatus, whether or not a voltage of an energy storage device in the energy storage apparatus reaches a lower limit voltage of a voltage range in which charge and discharge of electricity can be reversibly repeated; and, when it is determined that the voltage of the energy storage device reaches the lower limit voltage, making the flying object keep flying and/or descend while making the energy storage device discharge electricity within a voltage range lower than the lower limit voltage.

According to the aspects of the present invention, it is possible to enhance safety of a flying operation.

DETAILED DESCRIPTION OF VARIOUS EMBODIMENTS

Overall Configuration of Embodiments

In a method of controlling a flying object including a generator, which includes solar cells, and an energy storage apparatus according to an embodiment, in a case where, during flying of the flying object, a voltage of an energy storage device in the energy storage apparatus reaches a lower limit voltage of a voltage range in which charge and discharge of electricity can be reversibly repeated, the flying object is made to keep flying and/or descend while making the energy storage apparatus discharge electricity within a voltage range lower than the lower limit voltage.

As the generator, for example, a solar panel where a plurality of modules, in each of which solar cells are arranged, are arranged and are connected to each other may be used.

As the energy storage apparatus, for example, a battery cell (energy storage device) such as a lithium ion secondary battery, a battery module in which a plurality of battery cells are connected in series and/or in parallel, a structure (bank) in which a plurality of battery modules are connected in series, or a structure in which banks are connected in parallel may be used.

The flying object may be, for example, HAPS or eVTOL (electric vertical takeoff and landing aircraft), but is not limited thereto. The flying object includes the generator and the energy storage apparatus. However, it is preferable that the flying object do not include an internal combustion engine.

According to the above configuration, when the voltage of the energy storage device in the energy storage apparatus reaches the lower limit voltage at, e.g., night when the generator cannot sufficiently generate power, the flying object is made to fly and/or descend while making the energy storage device perform discharge in the voltage range lower than the lower limit voltage. With such a configuration, it is possible to make the flying object land on a ground while preventing falling of the flying object by gravity. By using a drone or the like at a low air zone, it is possible to perform treatment such as the exchange of the energy storage device, the addition of the energy storage device and charge of the energy storage device.

In the method of controlling a flying object described above, when a time necessary for recharge of the energy storage device is equal to or longer than a predetermined time, the flying object may be made to descend.

With the above configuration, in a case where it is determined that a predetermined time or more is required to generate power by the generator and to recharge the energy storage device so that it is difficult to continue the flight safely, the flying object can be descended and landed. For example, the determination may be made whether a time during which the generator generates electricity for charging the energy storage apparatus is equal to or longer than a standby time.

In the above-described method of controlling a flying object, the energy storage device may exhibit a predetermined discharge capacity in a voltage range lower than the lower limit voltage when the energy storage device reaches the lower limit voltage.

With such a configuration, in an emergency, energy for making the flying object keep flying and/or making the flying object descend can be generated.

In the above-described method of controlling a flying object, the energy storage device may allow the dissolving of lithium ions from a negative electrode in an electrolyte solution and the transfer of the lithium ions to a positive electrode in a voltage range lower than the lower limit voltage.

According to the above configuration, in an emergency, lithium ions can be transferred from the negative electrode to the positive electrode in the voltage range lower than the lower limit voltage and hence, a discharge capacity can be generated.

In the above-described method of controlling a flying object, the negative electrode may have a negative active material layer that contains lithium metal.

According to the above configuration, in an emergency, a sufficient amount of lithium ions can be transferred from the negative electrode to the positive electrode in a voltage range lower than the lower limit voltage.

A flying object according to an embodiment includes a generator, which includes a solar cell, and the energy storage apparatus, wherein in a case where, during flying of the flying object, a voltage of an energy storage device in the energy storage apparatus reaches a lower limit voltage of a voltage range in which charge and discharge of electricity can be reversibly repeated, the flying object is made to keep flying and/or descend while making the energy storage device discharge electricity within a voltage range lower than the lower limit voltage.

According to the above configuration, when the voltage of the energy storage device in the energy storage apparatus reaches the lower limit voltage at, e.g., night when the generator cannot sufficiently generate power, the flying object is made to fly and/or descend while making the energy storage device perform discharge in the voltage range lower than the lower limit voltage.

According to an embodiment, there is provided a computer program that causes a computer to execute processing for: determining, during flying of a flying object that includes a generator, which includes a solar cell, and an energy storage apparatus, whether or not a voltage of an energy storage device in the energy storage apparatus reaches a lower limit voltage of a voltage range in which charge and discharge of electricity can be reversibly repeated; and, when it is determined that the voltage of the energy storage device reaches the lower limit voltage, making the flying object keep flying and/or descend while making the energy storage device discharge electricity within a voltage range lower than the lower limit voltage.

Embodiment 1

Embodiment 1 will be described by taking a HAPS as an example. Hereinafter, discharge of electricity performed by the energy storage apparatus 7 for making the HAPS 1 fly and/or descend in an emergency is referred to as emergency discharge. In this embodiment, the case where the HAPS 1 is descended in an emergency is described. However, alternatively, the HAPS 1 may be made to keep flying without being made to descend.

Figure 1:
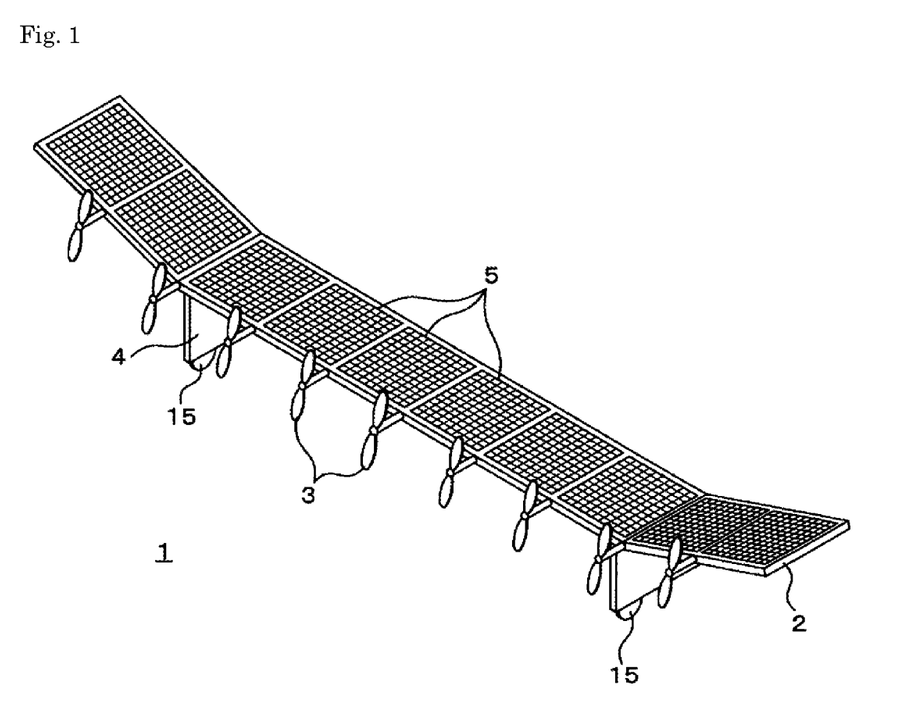
FIG. 1 is a perspective view illustrating an external appearance of a HAPS.
Figure 2:
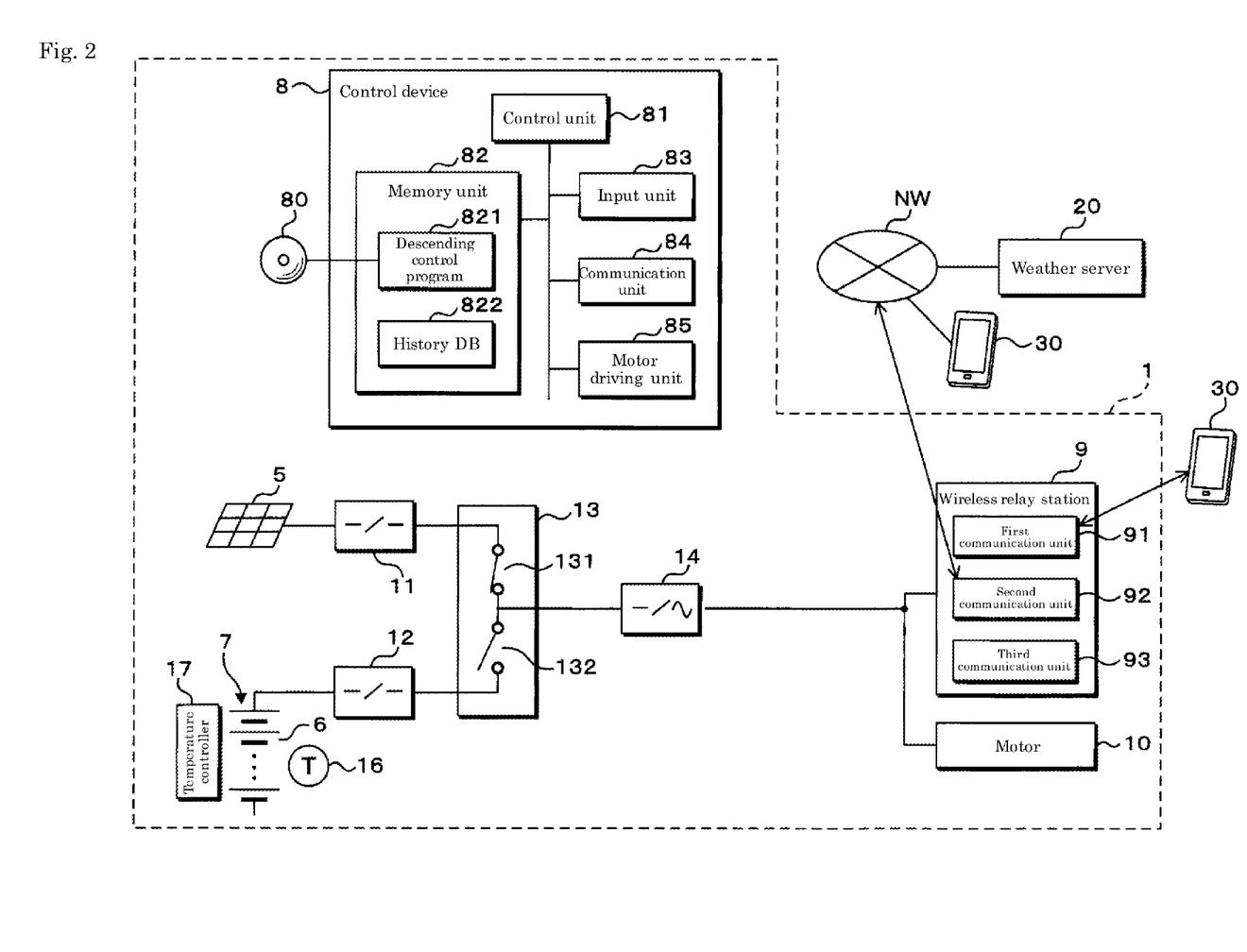
FIG. 2 is a block diagram illustrating the configuration of the HAPS.

FIG. 1 is a perspective view of an external appearance of the HAPS 1, and FIG. 2 is a block diagram illustrating a configuration of the HAPS 1. In FIG. 2, the connections between a control device 8 and respective units are omitted.

The HAPS 1 includes a wing portion 2, a plurality of propellers 3, a plurality of leg portions 4, a plurality of solar panels 5, an energy storage apparatus 7, the control device 8, a wireless relay station 9, a first converter circuit 11, a second converter circuit 12, a switching unit 13, an inverter circuit 14, wheels 15, a temperature sensor 16, and a temperature controller 17. The propellers 3 are connected to motors (electric motors) 10. The configuration of the HAPS 1 is not limited to this example. The energy storage apparatus 7, the control device 8, the wireless relay station 9, the first converter circuit 11, the second converter circuit 12, the switching unit 13, the inverter circuit 14, the temperature sensor 16, and the temperature controller 17 are accommodated in the leg portions 4. Alternatively, these constituent elements may be mounted in the wing portion 2.

The solar panel 5 is configured, for example, such that a plurality of modules in each of which a plurality of silicon-based solar cells are arranged are disposed and connected to each other.

As the energy storage apparatus 7, for example, a battery cell 6 such as a lithium ion secondary battery, a battery module in which a plurality of battery cells 6 are connected in series and/or in parallel, a structure (bank) in which a plurality of battery modules are connected in series, or a structure in which banks are connected in parallel may be used. In FIG. 2, a battery module that forms a part of the energy storage apparatus is illustrated as an example.

The temperature sensor 16 detects a temperature of the energy storage apparatus 7, and outputs a detection result to the control device 8.

The temperature controller 17 may include a heater that warms the energy storage apparatus 7 and a radiator that radiates heat from the energy storage apparatus 7.

The control device 8 includes a control unit 81, a memory unit 82, an input unit 83, a communication unit 84, and a motor drive unit 85.

The control unit 81 includes, for example, a central processing unit (CPU), a read only memory (ROM), a random access memory (RAM), and the like. The control unit 81 controls the operations of the respective units of the HAPS 1. The control unit 81 executes processing of a descending control by reading and executing a descending control program 821 described later. In this embodiment, the processing of the descending control refers to a processing where, when a discharge voltage of the energy storage apparatus 7 reaches a lower limit voltage and a time $t_1$ until recharge is longer than a standby time $t_2$, the HAPS 1 is made to descend and land on the ground while discharging electricity in a voltage range lower than the lower limit voltage. The processing of the descent control by the control unit 81 in an emergency is not limited to the case where the HAPS 1 is made to descend and land on the ground. Alternatively, the energy storage apparatus 7 or the battery cell 6 may be exchanged or added in a low altitude region using a drone or the like, or the energy storage apparatus 7 or the battery cell 6 may be charged in the low altitude region.

The memory unit 82 stores various programs including the descending control program 821 and a history database (DB) 822. The descending control program 821 is offered in a state where the program 821 is stored in a computer-readable recording medium 80 such as a CD-ROM, a DVD-ROM, or a USB memory, for example. The program 821 is stored in the memory unit 82 in a state where the program 821 is installed in the control device 8. Alternatively, the descending control program 821 may be acquired from an external computer (not illustrated) that is connected to a communication network, and may be stored in the memory unit 82.

The history DB 822 may store history data of power generation and discharge of the solar panel 5, history data of charge and discharge of the energy storage apparatus 7, history data of temperature of the energy storage apparatus 7, history data of weather information, history data of flight control of the HAPS 1, and the like. The history of power generation and discharge of the solar panel 5 is an operation history of the solar panel 5, and may include a history of information indicating a use period, a history of information regarding power generation (electric power or the like), or information regarding discharge (voltage, rate and the like). The charge-discharge history of the energy storage apparatus 7 is an operation history of the energy storage apparatus 7, and may include a history of information indicating a use period and a history of information on charge or discharge (voltage, rate, and the like).

The history of a temperature may be a history of the temperature of the energy storage apparatus 7 detected by the temperature sensor 16.

The history of the weather information may be histories of a wind speed and the wind direction, an amount of sunlight, and the like at the position of the HAPS 1 at the time of acquisition from the weather server 20.

The history of a flight control may be a history of the control of the flight of the HAPS 1 including rotational driving such as a rotational speed and a rotation time of the motor 10.

The input unit 83 receives inputting of detection results of currents and voltages of the solar panel 5 and the energy storage apparatus 7, and a temperature detection result of the temperature sensor 16. In FIG. 2, an ammeter and a voltmeter are omitted.

The communication unit 84 performs a function of performing communication between the communication unit 84 and other devices such as wireless relay stations 9, and performs transmission and reception of desired information.

The motor drive unit 85 controls the rotational driving of the respective motors 10 of the respective propellers 3. The rotational driving of the motor 10 by the motor drive unit 85 has: a discharge mode performed at the time of normal discharge; and an emergency discharge mode that differs from the normal discharge mode in a rotational speed, a rotation time, and the like. In the emergency mode, the HAPS 1 can be landed in an emergency.

The first converter circuit 11 is a DC/DC converter, is connected to the solar panel 5, and boosts and outputs an output voltage of the solar panel 5.

Second converter circuit 12 is connected to the energy storage apparatus 7, and is a bidirectional DC/DC converter that performs discharge and charge of the energy storage apparatus 7.

The inverter circuit 14 converts DC into AC. That is, the inverter circuit 14 converts a DC power inputted from the switching unit 13 into an AC power, and outputs the AC power.

The switching unit 13 includes, for example, two switches 131 and 132 that are connected in series. In FIG. 2, a control circuit for controlling charge and discharge is omitted. The switch 131 and the switch 132 are respectively formed of a switching element such as relays or a power MOSFET. A connection point between the switch 131 and the switch 132 is connected to the inverter circuit 14. The other end of the switch 131 and the other end of the switch 132 are respectively connected to the first converter circuit 11 and the second converter circuit 12.

The wireless relay station 9 and a load such as the motor 10 are connected to the inverter circuit 14.

When discharge of electricity is made from the solar panel 5 to the load, the switch 131 is turned on so as to connect the solar panel 5 to the load. FIG. 2 illustrates a state in which the switch 131 is turned on and power is supplied from the solar panel 5 to the load.

When discharge of electricity is made from the energy storage apparatus 7 to the load, the switch 132 is turned on so as to connect the energy storage apparatus 7 to the load.

When discharging electricity from the solar panel 5 and the energy storage apparatus 7 to the load, both the switch 131 and the switch 132 are turned on so as to connect the solar panel 5 and the energy storage apparatus 7 to the load.

The wireless relay station 9 includes a first communication unit 91, a second communication unit 92, and a third communication unit 93.

The first communication unit 91 includes an antenna, a transmitter-receiver duplexer, an amplifier, and the like. The first communication unit 91 performs transmission and reception of radio signals with a terminal device 30 used by a user in an airplane, a communication terminal device 30 of a drone, or the like. The second communication unit 92 includes an antenna, a transmitter-receiver duplexer, an amplifier, and the like, and performs transmission and reception of radio signals with relay stations on the ground or on the sea. The wireless relay station 9 is connected to the network NW of a mobile communication network via the relay station. A terminal device 30 is connected to the network NW. In FIG. 2, relay stations on the ground or on the sea are omitted. The third communication unit 93 performs transmission and reception with an artificial satellite and another HAPS by a laser beam or the like. The configuration of the wireless relay station 9 is not limited to this example.

The motor 10 rotationally drives the propeller 3. Alternatively, the motor 10 may drive a flying object propulsion device or a flying object ascending device that has configurations different from the configurations illustrated in FIG. 1.

Figure 3:
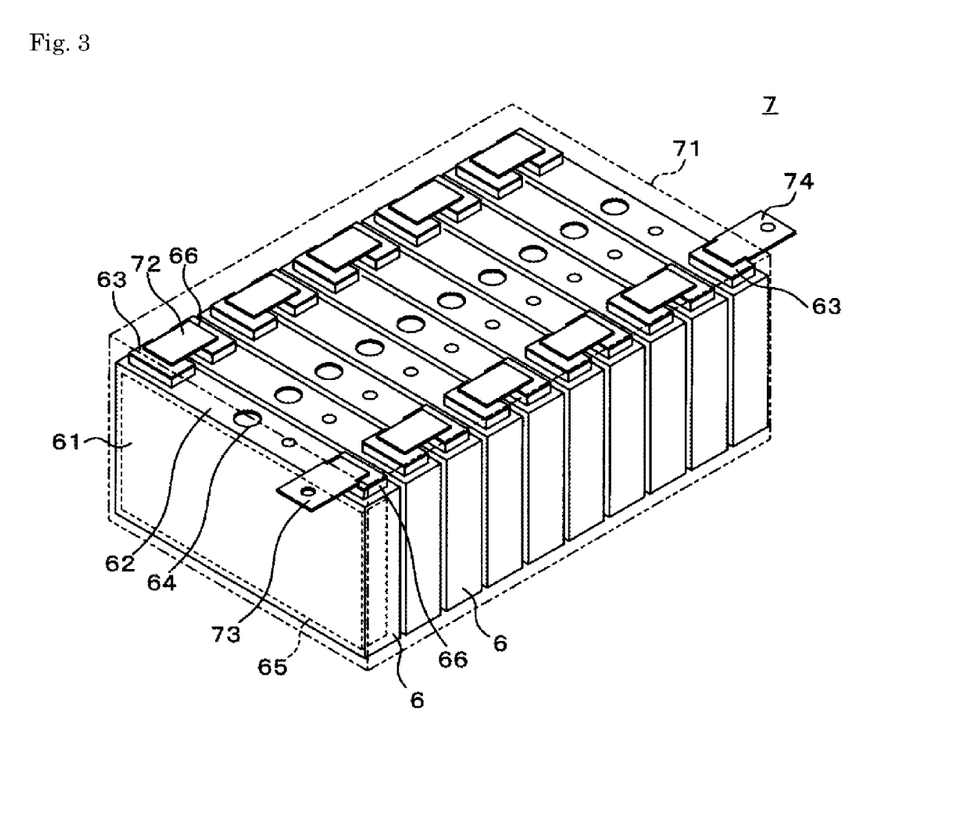
FIG. 3 is a perspective view of an energy storage apparatus.

FIG. 3 is a perspective view illustrating an example of the energy storage apparatus (battery module) 7. The energy storage apparatus 7 includes: a rectangular parallelepiped case 71; and a plurality of battery cells 6 accommodated in the case 71.

The battery cell 6 includes a rectangular parallelepiped (prismatic) case body 61, a lid plate 62, a positive electrode terminal 63 and a negative electrode terminal 66 mounted on the lid plate 62, a rupture valve 64, and an electrode assembly 65. Instead of the prismatic cell, the battery cell may be a so-called pouch cell having a laminate case. The electrode assembly 65 is formed by laminating a positive electrode plate, a separator and a negative electrode plate, and is accommodated in the case body 61.

The electrode assembly 65 may be obtained by winding a positive electrode plate and a negative electrode plate in a flat shape with a separator interposed therebetween. Alternatively, the electrode assembly 65 may be obtained by laminating a plurality of positive electrode plates and a plurality of negative electrode plates with a separator interposed therebetween.

In the above-described battery cell 6, it is preferable that, in a case where the energy storage device reaches the lower limit voltage, the energy storage device discharge a predetermined amount of discharge capacity in a voltage range lower than a lower limit voltage. As a result, energy for making the HAPS 1 descend can be generated.

It is preferable that the battery cell 6 be configured such that lithium ions are dissolved in an electrolyte solution (nonaqueous electrolyte) from the negative electrode and the lithium ions are transferred to the positive electrode in a voltage range lower than the lower limit voltage. Lithium ions can be transferred from the negative electrode to the positive electrode in the voltage range lower than the lower limit voltage and hence, a desired amount of discharge capacity can be discharged.

The positive electrode plate is formed by forming an active material layer on a positive electrode substrate material foil which is a plate-like (sheet-like) or long strip-like metal foil made of a metal such as aluminum, titanium, tantalum, or stainless steel or an alloy thereof. The negative electrode plate is formed by forming an active material layer on a negative electrode substrate material foil which is a plate-like (sheet-like) or long strip-like metal foil made of a metal such as copper, nickel, stainless steel, nickel plated steel or an alloy of these metals, or the like. The separator is a microporous sheet made of a synthetic resin.

The positive active material can be appropriately selected from known positive active materials, for example. As a positive active material for a lithium ion secondary battery, a material capable of occluding and releasing lithium ions is usually used. Examples of the positive active material include a lithium transition metal composite oxide having an $\alpha$-NaFeO$_2$-type crystal structure and a lithium transition metal oxide having a spinel-type crystal structure or the like. As examples of the lithium transition metal composite oxide having an $\alpha$-NaFeO$_2$-type crystal structure, Li [Li$_x$Ni$_{1-x}$]O$_2$ (0≤x<0.5), Li [Li$_x$Ni$\gamma$Co$_{(1-x-\gamma)}$]O$_2$ (0≤x<0.5, 0<$\gamma$<1), Li [Li$_x$Co$_{(1-x)}$]O$_2$ (0≤x<0.5), Li [Li$_x$Ni$\gamma$Mn$_{(1-x-\gamma)}$]O$_2$ (0≤x<0.5, 0<$\gamma$<1), Li [Li$_x$Ni$\gamma$Mn$\beta$Co$_{(1-x-\gamma-\beta)}$]O$_2$ (0≤x<0.5, 0<$\gamma$, 0<$\beta$, 0.5<$\gamma$+$\beta$≤1), and Li [Li$_x$Ni$\gamma$Co$\beta$Al$_{(1-x-\gamma-\beta)}$]O$_2$ (0≤x<0.5, 0<$\gamma$, 0<$\beta$, 0.5<$\gamma$+$\beta$<1) and the like are named. Examples of the lithium transition metal oxide having a spinel-type crystal structure include Li$_x$Mn$_2$O$_4$ and Li$_x$Ni$\gamma$Mn$_{(2-\gamma)}$O$_4$. These materials may have surfaces coated with other materials. In the positive active material layer, one kind of these materials may be used alone, or two or more kinds thereof may be used in mixture. In the positive active material layer, one kind of these compounds may be used alone, or two or more kinds thereof may be used in mixture. The content of the positive active material in the positive active material layer is not particularly limited, but the lower limit thereof is preferably 50 mass %, more preferably 80 mass %, and still more preferably 90 mass %. An upper limit of the content is preferably 99 mass %, and more preferably 98 mass %.

The positive composite forming the active material layer of the positive electrode contains optional components such as a conductive agent, a binder, a thickener, and a filler when necessary. Examples of the conductive agent include carbonaceous materials such as carbon black, metals, and conductive ceramics. Examples of the binder include thermoplastic resins such as a fluororesin (polytetrafluoroethylene (PTFE), polyvinylidene fluoride (PVDF), and the like), polyethylene, polypropylene, and polyimide. Examples of the thickener include polysaccharide polymers such as carboxymethyl cellulose (CMC) and methyl cellulose. Examples of the filler include polyolefins such as polypropylene and polyethylene.

The negative active material used for the negative active material layer preferably contains lithium metal. The negative active material contains lithium metal and hence, excessive lithium ions are contained in the negative active material. Accordingly, lithium ions are transferred from the negative electrode to the positive electrode, so that a required discharge capacity can be ensured. Lithium metal includes a lithium alloy in addition to lithium alone. Examples of a lithium alloy include a lithium aluminum alloy, for example. The negative electrode containing lithium metal can be manufactured by cutting lithium metal into a predetermined shape, or by molding lithium metal into a predetermined shape.

Furthermore, the negative active material layer may contain elements such as Na, K, Ca, Fe, Mg, Si, and N.

A lower limit of the content of lithium metal in the negative active material is preferably 80 mass %, more preferably 90 mass %, and still more preferably 95 mass %. An upper limit of the content of lithium metal may be set to 100 mass %.

The case body 61 is filled with an electrolyte solution. The electrolyte solution contains a nonaqueous solvent, and a sulfur-based cyclic compound, a fluorinated cyclic carbonate, a chain carbonate, and an electrolyte salt dissolved in the nonaqueous solvent. Examples of the sulfur-based cyclic compound include compounds having a sultone structure or a cyclic sulfate structure. Examples of the fluorinated cyclic carbonate include fluoroethylene carbonate. Examples of the chain carbonate include ethyl methyl carbonate.

The negative active material of the battery cell 6 may contain lithium metal, and the positive active material may be a lithium-excess type. According to such a battery cell 6, the battery cell 6 can exhibit high discharge capacity.

As the positive active material, an NCM (Ni+Co+Mn-based mixed positive active material) represented by $Li_x(Ni_aCo_bMn_c) O_2$ (a+b+c=1, 0<x<1.1) or the like may be used. In order to realize high energy density of the battery cell 6, the content of Ni may be increased.

The positive electrode terminal 63 and the negative electrode terminal 66 of the battery cells 6 of the energy storage apparatus 7 disposed adjacently to each other are electrically connected to each other by the bus bar 72 so that the plurality of battery cells 6 are connected in series.

A positive electrode lead 74 and a negative electrode lead 73 for extracting electric power are mounted on the positive electrode terminal 63 and the negative electrode terminal 66 of the battery cells 6 that are disposed at both ends of the energy storage apparatus 7.

A specific example of the battery cell 6 is described.

[Positive Electrode]

As the positive active material, a lithium transition metal composite oxide having an α-NaFeO$_2$-type crystal structure and represented by $Li_1+\alpha Me_1-\alpha O_2$ (Me is a transition metal) is used. In this embodiment, a molar ratio Li/Me of Li to Me is 1.33. Me is composed of Ni and Mn, and a molar ratio Ni/Mn of Ni to Mn is 1/2.

Using N-methylpyrrolidone (NMP) as a dispersion medium, a positive electrode paste that contains the positive active material, acetylene black (AB) as a conductive agent, and polyvinylidene fluoride (PVdF) as a binder at a mass ratio of 92.5:4.5:3.0 is prepared. A positive electrode is prepared such that a positive electrode paste is applied to one surface of an aluminum foil having a thickness of 15 μm as a positive electrode substrate. The positive electrode paste is dried, pressed, and then is cut to prepare the positive electrode in which a positive active material layer is disposed in a rectangular shape having a width of 30 mm and a length of 40 mm. A thickness of the positive active material layer is about 150 μm, and a positive composite is contained in an amount of 26 mg/cm² per unit area. The positive electrode is used after being dried at 120° C. for 14 hours or more under a reduced pressure.

[Preparation of Negative Electrode]

A lithium metal plate having a width of 30 mm, a length of 42 mm, and a thickness of 6100 μm is used as a negative electrode plate. The lithium metal plate is pressed at a pressure of 1.4 MPa with a metal-resin composite film interposed therebetween. A negative electrode substrate made of stainless steel is connected to the lithium metal plate only at an end portion having a length of 5 mm.

[Preparation of Electrolyte Solution]

A solution is prepared by dissolving LiPF$_6$ at a concentration of 1 mol dm⁻³ in a mixed solvent obtained by mixing fluoroethylene carbonate (FEC) and ethyl methyl carbonate (EMC) at a volume ratio of FEC:EMC=30:70. Further, 2% by mass of 1,3-propenesultone is added to the solution to obtain an electrolyte solution.

[Preparation of Battery Cell 6]

A polypropylene microporous membrane having a thickness of 27 μm and having a surface thereof modified with polyacrylate is used as a separator. Four separators are stacked, and the periphery of the separators is fused with one side of the separators is left. As a result, a bag-shaped separator having three bag portions is prepared. The negative electrode is inserted into the bag portion at the center of the bag-shaped separator, and two positive electrodes are inserted into the bag portions on both sides of the bag-shaped separator at the center such that the surfaces on each of which the positive active material layer is disposed are made to face the negative electrode. In accordance with the steps described above, the laminated electrode assembly 65 having two facing surfaces where the positive electrode and the negative electrode face each other is prepared.

The electrode assembly 65 is accommodated in the metal-resin composite film which is the case 61 in advance such that the open ends of the lead terminals that are respectively connected to the positive electrode and the negative electrode are exposed to the outside. The case is sealed except for a portion where an electrolyte solution filling hole is formed. Then, the case 61 is filled with an electrolyte solution through the electrolyte solution filling hole, and the electrolyte solution filling hole is hermetically sealed. The battery cell 6 is manufactured as described above.

The configuration of the battery cell 6 is not limited to the case described above. Lithium may be attached to the negative electrode. The electrolyte solution may contain a lithium salt capable of supplying lithium ions to the positive electrode at the time of emergency discharge.

Figure 4:
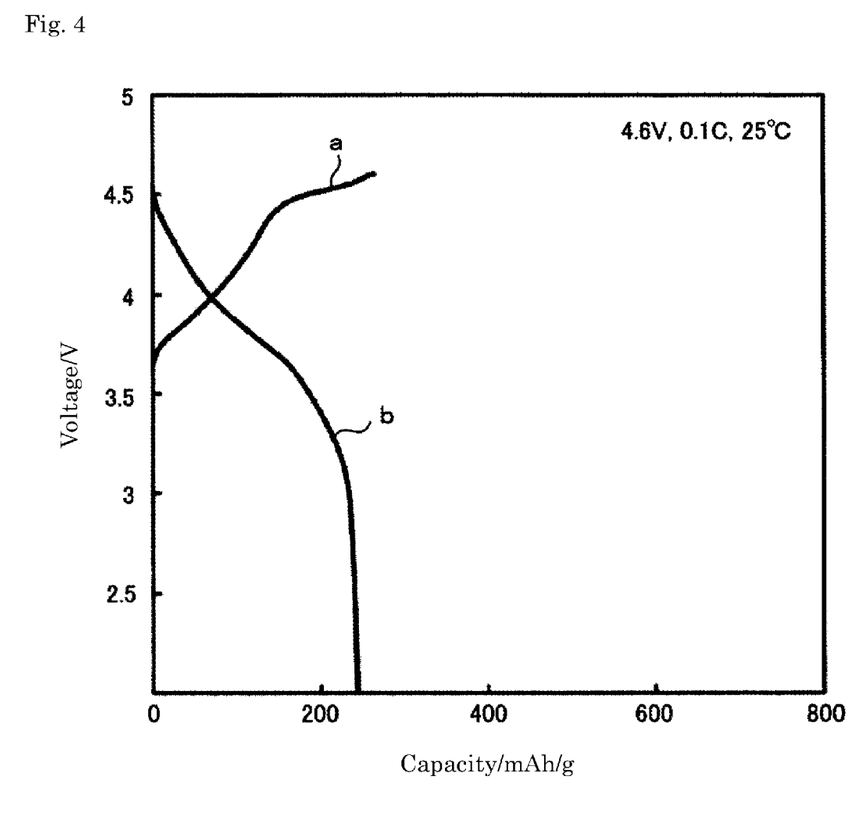
FIG. 4 is a charge curve and a discharge curve of a battery cell in a voltage range in which charge and discharge of electricity can be reversibly repeated.

FIG. 4 is a charge curve and a discharge curve in a voltage range in which charge and discharge of electricity can be reversibly repeated with respect to the battery cell 6 prepared as described above. In FIG. 4, the capacity (mAh/g) is taken on an axis of abscissas, and a voltage (V) is taken on an axis of ordinates. In FIG. 4, a is a charge curve, and b is a discharge curve.

It can be understood from FIG. 4 that the battery cell 6 can be discharged in a range of from 4.6 V to 2 V during a normal use.

Figure 5:
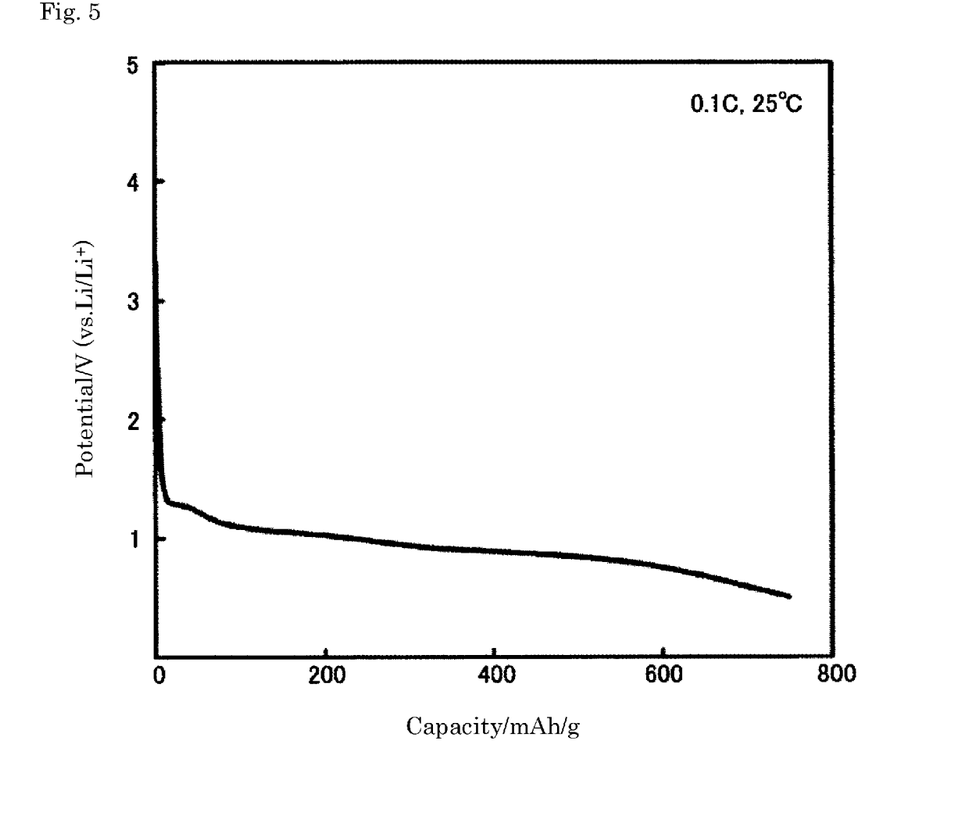
FIG. 5 is a discharge curve of a positive electrode during emergency discharge.

FIG. 5 is a discharge curve of the positive electrode during emergency discharge. In FIG. 5, capacity (mAh/g) is taken on an axis of abscissas, and a potential V (a potential based on vsLi/Li⁺:Li/Li⁺ equilibrium potential) is taken on an axis of ordinates.

It can be understood from FIG. 5 that the battery cell 6 can exhibit a discharge capacity in a potential range that corresponds to a voltage range lower than 2 V that is a lower limit voltage. Therefore, the battery cell 6 can exhibit, with high reliability, energy for making the HAPS 1 descend and land on the ground.

In the case of the battery cell 6 described above, the following reaction is generated on the positive electrode.

[Formula 1]

The negative active material of the battery cell 6 contains lithium metal. Accordingly, lithium ions can be dissolved in the electrolyte solution from the negative electrode and delivered to the positive electrode even in a voltage range below a lower limit voltage of 2.0 V. Accordingly, a reductive reaction advances and hence, the battery cell 6 can exhibit discharge capacity.

With respect to the HAPS 1 having the above-mentioned configuration, the HAPS 1 takes off from the ground in an obliquely upward and, thereafter, floats by its lift while spiraling in a region in a predetermined horizontal direction, and rises to an air zone A. As the air zone A, for example, an air zone in a stratosphere at an altitude of 11 km to 50 km is named. Among such an air zone, an air zone at an altitude of 20 km is desirable. After the flying object rises to the air zone A, the HAPS 1 horizontally moves to a position B in the horizontal direction, and stays at the position B. At night, the flying object slides in the air zone A while turning in a state where a downward angle is made.

In the present embodiment, in a case where a voltage of the energy storage apparatus 7 reaches the lower limit voltage during the flight of the HAPS 1, and the time $t_1$ until recharge is longer than the standby time $t_2$, the HAPS 1 is made to descend and land on the ground. There may be a case where dendrite or the like is generated on the battery cell 6 so that the battery cell 6 is deteriorated and hence, SOH is lowered and a voltage of the battery cell 6 reaches a lower limit voltage earlier, while the energy storage apparatus 7 cannot be charged by the solar panel 5. In such a case, emergency discharge is applied.

Figure 6:
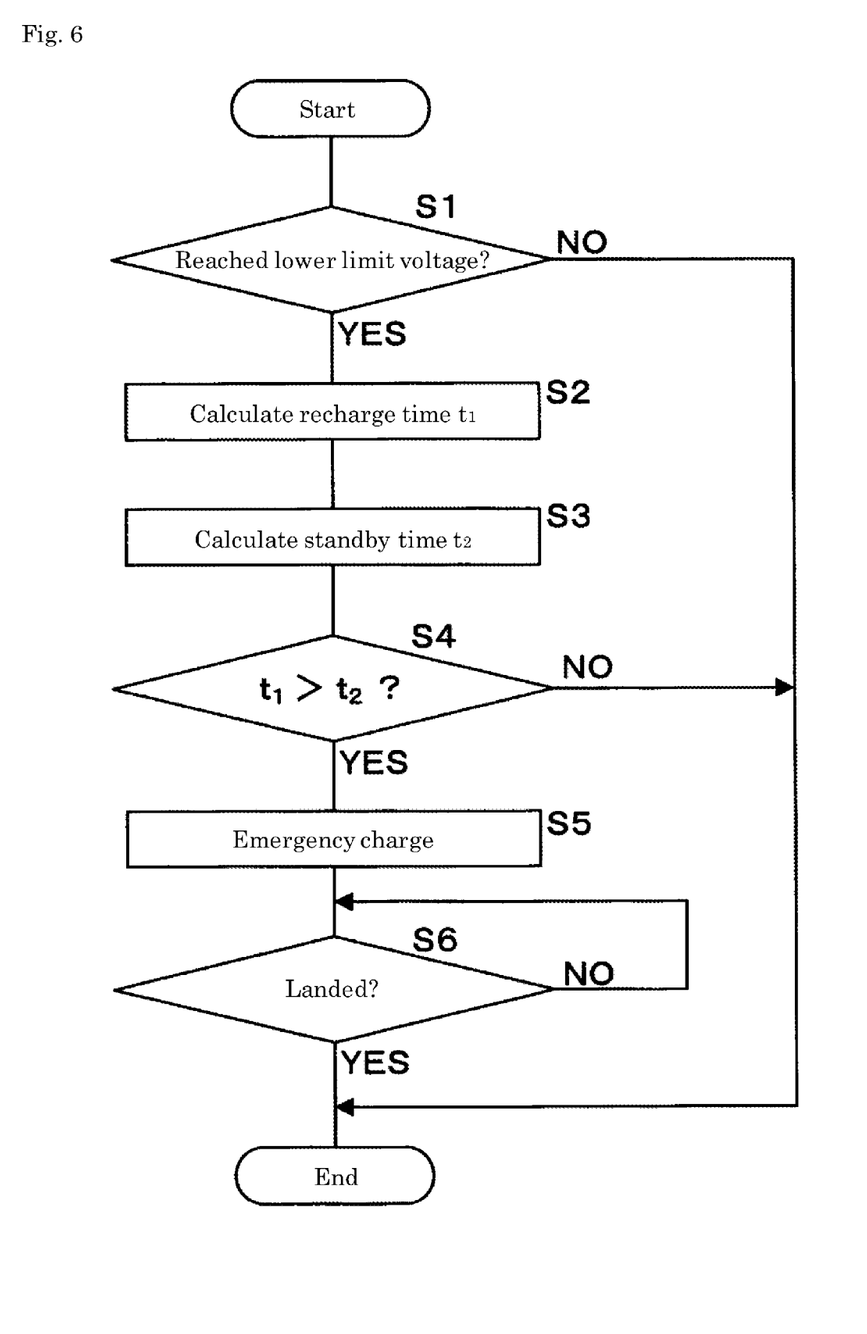
FIG. 6 is a flowchart illustrating steps of processing of a descending control performed by a controller.

FIG. 6 is a flowchart describing the processing steps of a descending control performed by the control unit 81.

The control unit 81 determines whether or not a voltage of energy storage apparatus 7 reaches the lower limit voltage (S1). The voltage of the energy storage apparatus 7 may be a sum of voltages of the battery cells 6 that the energy storage apparatus 7 includes. When the voltage of energy storage apparatus 7 does not reach the lower limit voltage (S1: NO), the control unit 81 finishes the processing.

When the voltage of energy storage apparatus 7 reaches the lower limit voltage (S1: YES), control unit 81 calculates time $t_1$ until recharge (S2). The control unit 81 calculates a time $t_1$ until the solar panel 5 can generate power so as to charge the energy storage apparatus 7. For example, in the case of night flight, a time until sunrise, an estimated sunlight amount, and the like are acquired from a weather server 20, and the time $t_1$ is calculated. The control unit 81 may calculate the time $t_1$ until the energy storage apparatus 7 is charged while making the HAPS 1 fly by the power generated by the solar panel 5. The time $t_1$ may be a time until power generation is started or a time until the energy storage apparatus 7 reaches a required SOC. The present invention is not limited to the case where the HAPS 1 is flying at night. Also when an amount of sunlight is small so that the energy storage apparatus 7 cannot be sufficiently charged by the solar panel 5, the time $t_1$ until the energy storage apparatus 7 reaches a required SOC may be calculated.

The control unit 81 calculates a standby time $t_2$ (S3). The control unit 81 acquires, for example, a wind speed, a wind direction, and the like from the weather server 20, and calculates a time $t_2$ during which power generation can be waited while performing gliding or the like.

The control unit 81 determines whether or not the relationship $t_1 > t_2$ is satisfied (S4).

When the control unit 81 determines that the relationship $t_1 > t_2$ is not satisfied (S4: NO), the processing is finished.

When the relationship $t_1 > t_2$ is satisfied (S4: YES), the control unit 81 starts the emergency discharge (S5). The control unit 81 rotationally drives the motor 10 in an emergency discharge mode. The emergency discharge mode may be set in consideration of a wind speed, a wind direction, and the like.

The control unit 81 determines whether or not the HAPS 1 has landed on the ground (S6). When the HAPS 1 has not yet landed on the ground (S6: NO), the control unit 81 repeats this determination.

When the HAPS 1 has landed on the ground (S6: YES), the control unit 81 finishes the processing.

The descending control processing is not limited to the case of making the HAPS 1 land on the ground. Alternatively, the energy storage apparatus 7 or the battery cell 6 may be exchanged, added or charged in a low altitude region using a drone or the like.

With such a configuration, in a case where a voltage of the energy storage apparatus 7 reaches a lower limit voltage at night or the like when the solar panel 5 cannot generate power, the HAPS 1 is made to descend while performing discharge of the energy storage apparatus 7 in a voltage range lower than the lower limit voltage. HAPS 1 lands on the ground with high reliability without crashing to the ground. Alternatively, the energy storage apparatus 7 or the battery cell 6 may be exchanged, added or charged in a low altitude region using a drone or the like.

A discharge capacity may be increased to a desired capacity by warming the energy storage apparatus 7 using the temperature controller 17. In this way, the HAPS 1 can land on the ground with high reliability regardless of a temperature of a landing place.

The standby time $t_2$ be a preset time.

The embodiment described above is not restrictive. The scope of the present invention is intended to embrace all modifications within the meaning and the scope that are considered equivalent to the claim.

The generator is not limited to a generator that has solar cells. The generator preferably be a generator having a carbon dioxide emission amount at the time of power generation smaller than a carbon dioxide emission amount at the time of driving an internal combustion engine. The following embodiments are also included in the present invention.

(1) A method of controlling a flying object including a generator and an energy storage apparatus, wherein in a case where, during flying of the flying object, a voltage of an energy storage device in the energy storage apparatus reaches a lower limit voltage of a voltage range in which charge and discharge of electricity can be reversibly repeated, the flying object is made to keep flying and/or to descend while making the energy storage device discharge electricity within a voltage range lower than the lower limit voltage.

(2) A flying object including a generator and an energy storage apparatus, wherein in a case where, during flying of the flying object, a voltage of an energy storage device in the energy storage apparatus reaches a lower limit voltage of a voltage range in which charge and discharge of electricity can be reversibly repeated reaches a lower limit voltage of the voltage range, the flying object is made to keep flying and/or to descend while making the energy storage device discharge electricity within a voltage range lower than the lower limit voltage.

(3) A computer program that causes a computer to execute processing for: determining, during flying of the flying object that includes the generator and the energy storage apparatus, whether or not a voltage of an energy storage device in the energy storage apparatus reaches a lower limit voltage of a voltage range in which charge and discharge of electricity can be reversibly repeated; and, when it is determined that the voltage of the energy storage device reaches the lower limit voltage, making the flying object keep flying and/or descend while making the energy storage device discharge electricity within a voltage range lower than the lower limit voltage.

The present invention is not limited to the case where the flying object includes the control device 8. A computer or a server that is wirelessly connected to the flying object may control descending and discharge of the flying object.

The HAPS 1 is not limited to a solar plane. The HAPS 1 may be an airship, a stratospheric jet plane.

The flying object is not limited to the HAPS. The present invention is also applicable to other electric flying objects such as an eVTOL and a hybrid flying object equipped with a generator and an internal combustion engine.

The present invention is also applicable to a flying object such as a drone that includes an energy storage apparatus but does not include a generator. For example, when an SOH of the energy storage apparatus becomes a predetermined value or less and reaches a lower limit voltage, the descending discharge according to the present invention is performed.

The energy storage device is not limited to a lithium ion secondary battery. The energy storage device may be selected from other secondary batteries or capacitors.

The invention claimed is:

1. A method of controlling a flying object that includes a generator, which includes a solar cell, and an energy storage apparatus, the method comprising, during flying of the flying object, the steps of:
   in a first mode, determining when a voltage of an energy storage device in the energy storage apparatus reaches a lower limit voltage of a voltage range in which charge and discharge of electricity can be reversibly repeated; and
   in a second mode, when a time until the energy storage device is recharged is a predetermined time or more, at least one of maintaining or decreasing altitude of the flying object while making the energy storage device discharge electricity within a voltage range lower than the lower limit voltage,
   wherein, in a voltage range lower than the lower limit voltage, the method further comprises dissolving of lithium ions from a negative electrode in an electrolyte solution and transferring of the lithium ions to a positive electrode.

2. The method of controlling a flying object according to claim 1, wherein, in a case where the energy storage device reaches the lower limit voltage, the energy storage device is capable of exhibiting a predetermined discharge capacity.

3. The method of controlling a flying object according to claim 1, wherein the negative electrode includes a negative active material that contains lithium metal.

4. A flying object comprising:
   a generator that has a solar cell; and
   an energy storage apparatus,
   wherein:
   in a first mode during flying of the flying object case where, during flying of the flying object in a first mode, a voltage of an energy storage device in the energy storage apparatus reaches a lower limit voltage of a voltage range in which charge and discharge of electricity can be reversibly repeated,
   in a second mode during the flying of the flying object, when case where a time until the energy storage device is recharged is a predetermined time or more, altitude of the flying object is at least one of maintained or decreased made to keep flying and/or descend in a second mode while making the energy storage device discharge electricity within a voltage range lower than the lower limit voltage, and
   in a voltage range lower than the lower limit voltage, dissolving of lithium ions from a negative electrode in an electrolyte solution and transferring of the lithium ions to a positive electrode occurs.

5. A computer program that causes a computer to execute processing for:
   determining, during flying of a flying object in a first mode of the flying object that includes a generator, which includes a solar cell, and an energy storage apparatus in a first mode, determining whether or not a voltage of an energy storage device in the energy storage apparatus reaches a lower limit voltage of a voltage range in which charge and discharge of electricity can be reversibly repeated; and
   when it is determined that the voltage of the energy storage device reaches the lower limit voltage, and in a second mode, when case where a time until the energy storage device is recharged is a predetermined time or more, at least one of maintaining or decreasing altitude of making the flying object keep flying and/or descend in a second mode while making the energy storage device discharge electricity within a voltage range lower than the lower limit voltage, and
   in a voltage range lower than the lower limit voltage, dissolving of lithium ions from a negative electrode in an electrolyte solution and transferring of the lithium Ions to a positive electrode.

6. The flying object according to claim 4, wherein, in a case where the energy storage device reaches the lower limit voltage, the energy storage device is capable of exhibiting a predetermined discharge capacity.

7. The flying object according to claim 4, wherein the negative electrode includes a negative active material that contains lithium metal.

8. The computer program according to claim 5, wherein, in a case where the energy storage device reaches the lower limit voltage, the energy storage device is capable of exhibiting a predetermined discharge capacity.

9. The computer program according to claim 5, wherein the negative electrode includes a negative active material that contains lithium metal.

* * * * *